United States Patent [19]

Horike et al.

[11] 4,434,593
[45] Mar. 6, 1984

[54] WINDOW STRUCTURE OF A VEHICLE BODY

[75] Inventors: Masayoshi Horike; Haruo Yamamoto; Yukio Yamane, all of Yokosuka; Kazuhiko Yoshiyuki, Yokohama; Toshiaki Endo, Chigasaki, all of Japan

[73] Assignee: Nissan Motor Company, Limited, Yokohama, Japan

[21] Appl. No.: 257,606

[22] Filed: Apr. 27, 1981

[30] Foreign Application Priority Data

May 6, 1980 [JP] Japan .................. 55-58579

[51] Int. Cl.³ .................................. B60J 1/02
[52] U.S. Cl. ......................... 52/208; 52/716; 296/93; 296/84 D
[58] Field of Search .............. 52/208, 397, 400; 296/84 R, 84 D, 93; 57/716

[56] References Cited

U.S. PATENT DOCUMENTS

| | | | |
|---|---|---|---|
| 2,009,637 | 7/1935 | Schutte | 296/48 |
| 2,342,758 | 2/1944 | Saunders | 52/208 |
| 2,497,957 | 2/1950 | Pelley | 52/397 |
| 2,613,402 | 10/1952 | Gouge | 52/208 |
| 3,078,119 | 2/1963 | Premo | 52/400 |
| 3,274,740 | 9/1966 | Hall | 52/400 |
| 3,375,626 | 4/1968 | Grotefeld | 52/208 |
| 3,566,542 | 4/1969 | Gillen | 52/400 |
| 3,694,985 | 10/1972 | Spaiches | 52/208 |
| 3,760,544 | 9/1973 | Hawes et al. | 52/468 |
| 3,774,363 | 11/1973 | Kent | 52/208 |
| 3,846,948 | 11/1974 | Dallen | 52/400 |
| 3,981,113 | 9/1976 | Griffin | 52/208 |
| 3,981,697 | 9/1976 | Buckthorpe | 52/208 |
| 4,139,971 | 2/1979 | Kimura | 52/208 |
| 4,165,119 | 8/1979 | Hedeen | 296/93 |

FOREIGN PATENT DOCUMENTS

| | | | |
|---|---|---|---|
| 8692 | 1/1968 | Australia | 78/73 |
| 960087 | 12/1974 | Canada | 52/213 |
| 1145087 | 10/1957 | France | 296/84 R |
| 1238199 | 6/1960 | France | |
| 1465492 | 1/1967 | France | 296/93 |
| 537111 | 6/1941 | United Kingdom | 52/397 |
| 778882 | 7/1957 | United Kingdom | 296/93 |
| 1174578 | 12/1969 | United Kingdom | |
| 2047785A | 12/1980 | United Kingdom | |
| 2049010A | 12/1980 | United Kingdom | |

Primary Examiner—R. P. Machado
Assistant Examiner—Alvin Chin-Shue
Attorney, Agent, or Firm—Lane, Aitken & Kananen

[57] ABSTRACT

A window structure of a vehicle body comprises a wall portion forming part of the vehicle body and defining an opening therein; a window panel closing the opening and having at least one edge portion extending along and spaced apart inwardly from the wall portion for forming a gap between the wall portion and the edge portion; a resilient molding having a decorative trim portion bridging the window panel and the vehicle body for covering the gap, a stem portion integral with the decorative trim portion and extending in the gap, and a plurality of retrorse fins extending outwardly from both sides of the stem portion and angled toward the decorative trim portion for engagement with the edge portion of the window panel and the wall portion of the vehicle body; and retaining means for retaining the retrorse fins in engagement with the edge portion of the window panel and the wall portion of the vehicle body.

5 Claims, 11 Drawing Figures

WINDOW STRUCTURE OF A VEHICLE BODY

FIELD OF THE INVENTION

The present invention relates to a window structure of a vehicle body and, more particularly, to a window structure including a window panel and a resilient molding which is firmly retained between the vehicle body and the window panel especially when the resilient molding is interposed therebetween.

SUMMARY OF THE INVENTION

In accordance with the present invention, there is provided a window structure of a vehicle body which comprises a wall portion forming part of the vehicle body and defining an opening therein; a window panel closing the opening and having at least one edge portion extending along and spaced apart inwardly from the wall portion for forming a gap between the wall portion and the edge portion; a resilient molding having a decorative trim portion bridging the window panel and the vehicle body for covering the gap, a stem portion integral with the decorative trim portion and extending in the gap, and a plurality of retrorse fins extending outwardly from both sides of the stem portion and angled toward the decorative trim portion for engagement with the edge portion of the window panel and the wall portion of the vehicle body; and retaining means for retaining the retrorse fins in engagement with the edge portion of the window panel and the wall portion of the vehicle body.

BRIEF DESCRIPTION OF THE DRAWINGS

Drawbacks of a prior-art window structure and the features of a window structure proposed by the present invention will be understood from the following description taken in conjunction with the accompanying drawings, in which like reference numerals designate corresponding or similar members and elements and in which.

DESCRIPTION OF THE PRIOR ART

Figure 1:
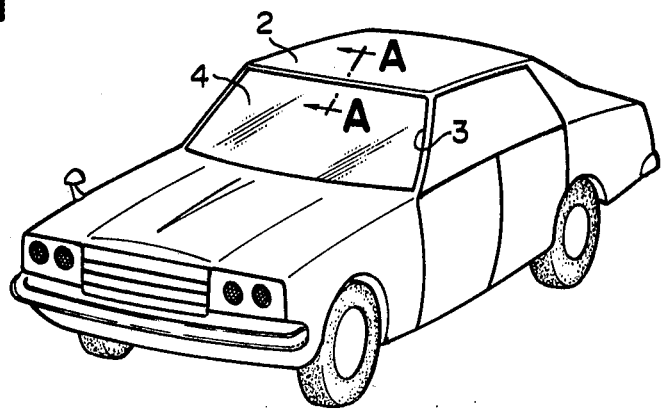
FIG. 1 is a perspective view showing an automotive vehicle with a window structure.
Figure 2:
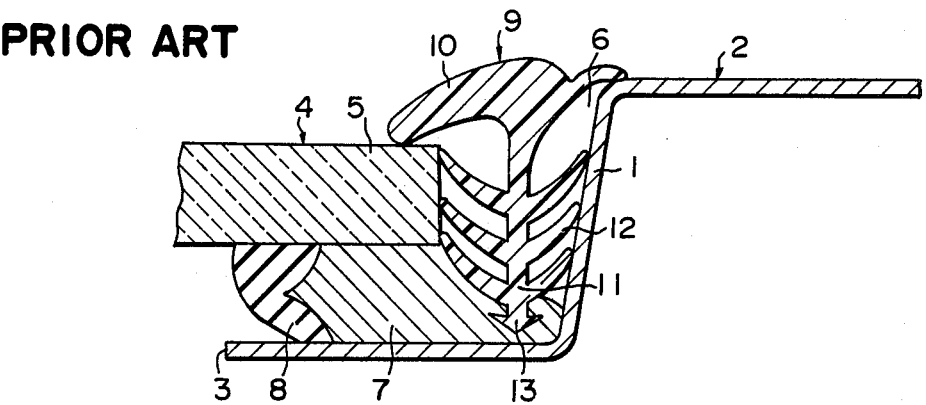
FIG. 2 is an enlarged fragmentary cross sectional view taken on the line A—A in FIG. 1 but showing a portion of a prior-art window structure.

Such a window structure is employed in a vehicle such as, for example, an automotive vehicle as shown in FIG. 1. There have thus far been proposed various types of window structures of vehicle bodies one of which is shown in FIG. 2 as comprising a wall portion 1 forming part of a vehicle body 2 and defining an opening 3 therein. The opening 3 is closed by a window panel 4 of, for example, glass which has at least one edge portion 5 extending along and spaced apart inwardly from the wall portion 1 for forming a gap 6 between the wall portion 1 and the edge portion 5. Between the wall portion 1 of the vehicle body 2 and the edge portion 5 of the window panel 4 is interposed an adhesive compound 7 by means of which the wall portion 1 is bonded to the edge portion 5. A dam rubber 8 is also interposed between the wall portion 1 and the edge portion 5 adjacent the opening 3 so as to secure the wall portion 1 to the edge portion 5 and to hold the adhesive compound 7 in position in the gap 6 between the wall portion 1 and the edge portion 5. A resilient molding 9 comprises a decorative trim portion 10 bridging the window panel 4 and the vehicle body 2 for covering the gap 6, a stem portion 11 integral with the decorative trim portion 10 and extending in the gap 6, and a plurality of retrorse fins 12 extending outwardly from both sides of the stem portion 11 and angled toward the decorative trim portion 10 for engagement with the edge portion 5 of the window panel 4 and the wall portion 1 of the vehicle body 2. The stem portion 11 has formed at its inner end a bead 13 which is arrow-shaped in cross section and which is embedded in the adhesive compound 7 for preventing the resilient molding 9 from being dislodged out of the gap 6.

With such a construction as shown in FIG. 2, the resilient molding 9 is held in the gap 6 between the wall portion 1 of the vehicle body 2 and the edge portion 5 of the window panel 4 simply by the arrow-shaped bead 13 embedded in the adhesive compound 7 so that the stem portion 11 tends to be outwardly dislodged out of the gap 6 by the force of the resilient molding 9. When this occurs, the decorative trim portion 10 becomes corrugated which not only impairs the external appearance of the window structure as a whole but also invites irregularities of installation of window structures on vehicle bodies during assemblage of vehicles. The present invention contemplates provision of an improved window structure which has the resilient molding firmly retained in the gap between the wall portion of the vehicle body and the edge portion of the window panel for preventing the resilient molding from being outwardly dislodged out of the gap.

DESCRIPTION OF THE EMBODIMENTS

Figure 3:
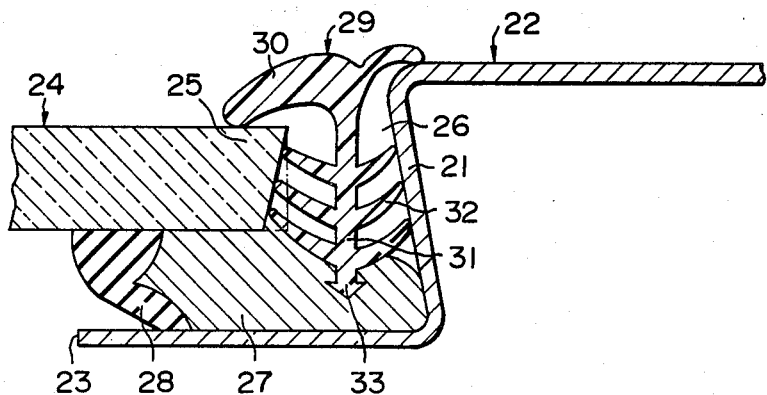
FIG. 3 is an enlarged fragmentary cross sectional view taken on the line A—A in FIG. 1 but showing a portion of a first embodiment of a window structure according to the present invention.

Referring now to FIG. 3 of the drawings, a first embodiment of a window structure according to the present invention is shown comprising a wall portion 21 forming part of a vehicle body 22 and defining an opening 23 therein. A window panel 24 made of, for example, glass is adapted to close the opening 23 and has at least one edge portion 25 which extends along and is spaced apart inwardly from the wall portion 21 for forming a gap 26 between the wall portion 21 and the edge portion 25. Between the wall portion 21 of the vehicle body 22 and the edge portion 25 of the window panel 24 is interposed an adhesive compound 27 by means of which the wall portion 21 is bonded to the edge portion 25. A dam rubber 28 is also interposed between the wall portion 21 and the edge portion 25 adjacent the opening 23 so as to secure the wall portion 21 to the edge portion 25 and to hold the adhesive compound 27 in position in the gap 26 between the wall portion 21 and the edge portion 25. A resilient molding generally indicated at 29 is constructed by a flexible material such as a synthetic resin or the like and comprises a decorative trim portion 30 bridging the window panel 24 and the vehicle body 22 for covering the gap 26, a stem portion 31 integral with the decorative trim portion 30 and extending in the gap 26, and a plurality of retrorse fins 32 extending outwardly from both sides of the stem portion 31 and angled toward the decorative trim portion 30 for engagement with the edge portion 25 of the window panel 24 and the wall portion 21 of the vehicle body 22. The stem portion 31 has formed at its inner end a bead 33 which is arrow-shaped in cross section and which is embedded in the adhesive compound 27 for preventing the resilient molding 29 from being dislodged out of the gap 26. The embedding process of the bead 33 is carried out in such a manner that the bead 33 is firstly anchored into the adhesive compound 27 when it is uncured in a fluid state and is secondly bonded to the adhesive compound 27 when it is cured. The gap 26 has an outer end adjacent the decorative trim portion 30 and an inner end remote from the decorative trim portion 30. The edge portion 25 and the wall portion 21 have cross sections which are such that the width of the gap 26 is reduced from the inner end toward the outer end. Namely, the end faces of the edge portion 25 and the wall portion 21 are inclined such that the gap 26 is wider at the inner end than at the outer end. With this construction, the retrorse fins 32 of the resilient molding 29 can readily be forced to shrink when the bead 33 is anchored into the adhesive compound 27 and the retrorse fins 32 are pressed into the gap 26. The retrorse fins 32 are then allowed to expand by their resiliencies and held in engagement with the end face of the edge portion 25 and the wall portion 21, thereby preventing the resilient molding 29 from being outwardly dislodged out of the gap 26. It is therefore understood that the resilient molding 29 can firmly be retained in the gap 26 by the wall portion 21 and the edge portion 25 when the resilient molding 29 is held in place between the window panel 24 and the vehicle body 22. The end face of the edge portion 25 and the wall portion 21 which are inclined as above constitute as a whole retaining means for retaining the retrorse fins 32 in engagement with the edge portion 25 and the wall portion 21.

In the second to ninth embodiments as shown in FIGS. 4 to 11, only the retaining means are modified and the remaining members or elements forming part of the window structure are substantially identical to those of the window structure as shown in FIG. 3. Therefore, description of the remaining menbers or elements of the window structure as shown in FIGS. 4 to 11 will be omitted for simplicity but indicated by the same reference numerals as those of the window structure in FIG. 3.

Figure 4:
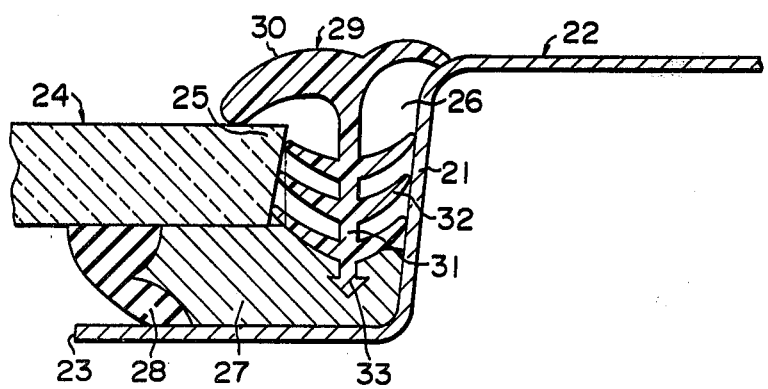
FIGS. 4 to 11 are cross sectional views similar to FIG. 3 but showing second to ninth embodiments of the window structure according to the present invention.

In the second embodiment of the window structure as shown in FIG. 4, the end face of the edge portion 25 is inclined with respect to the wall portion 21 in such a manner that the width of the gap 26 is reduced from the inner end toward the outer end. In this instance, the retaining means is formed by the edge portion 25 of the window panel 24 so that the retrorse fins 32 are firmly retained in engagement with the edge portion 25 and wall portion 21.

Figure 5:
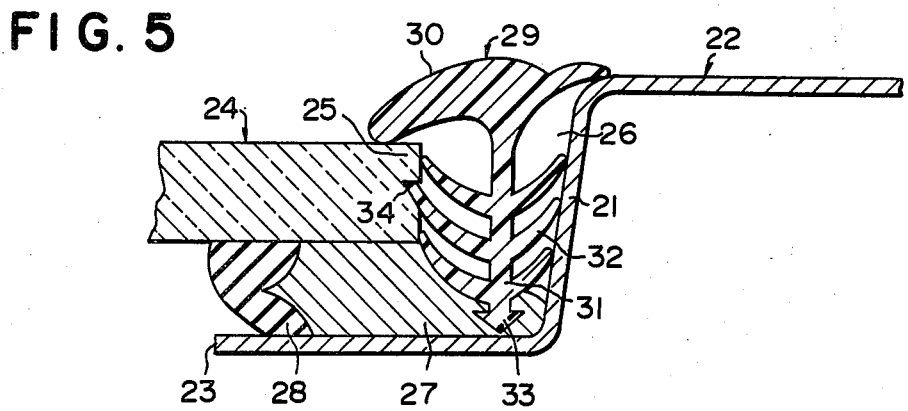

In the third embodiment of the window structure as shown in FIG. 5, the edge portion 25 of the window panel 24 is formed with a groove 34 which has one of the retrorse fins 32 of the resilient molding 29 edgewise received therein. In this instance, the groove 34 also constitutes the retaining means for retaining the retrorse fins 32 in engagement with the edge portion 25 and the wall portion 21.

Figure 6:
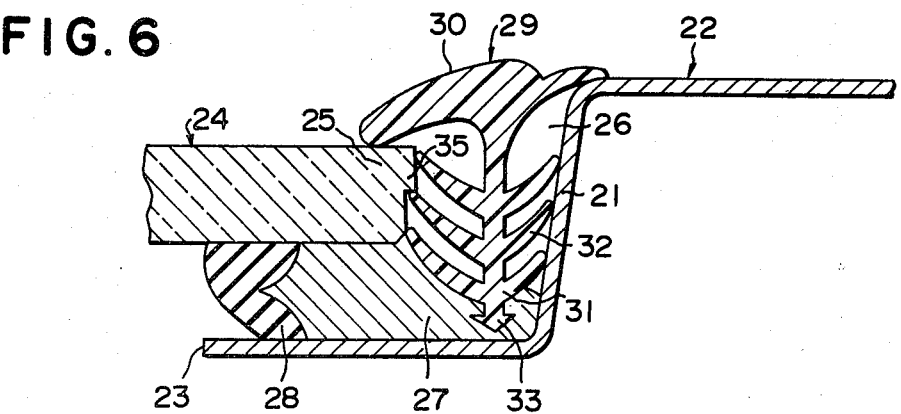

In the fourth embodiment of the window structure as shown in FIG. 6, a longitudinally extending ledge 35 is formed as part of the edge portion 25. The cross section of the edge portion 25 is such that the width of the gap 26 at the outer end is smaller than that of the gap 26 at the inner end so that one of the retrorse fins 32 of the resilient molding 29 is held in engagement with the ledge 35. In this instance, the ledge 35 also constitutes the retaining means for retaining the retrorse fins 32 in engagement with the edge portion 25 and the wall portion 21.

Figure 7:
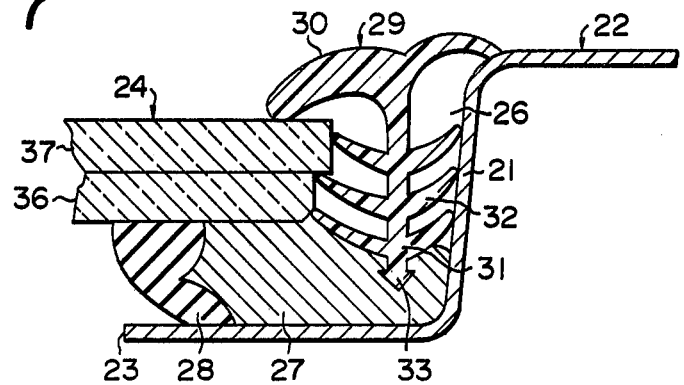

In the fifth embodiment of the window structure as shown in FIG. 7, the window panel 24 comprises a laminar structure of at least two panel components consisting of inner and outer panel components 36 and 37 attached to each other by a suitable adhesive material in such a way that the outer component 37 projects into the gap 26 beyond the inner panel component 36. In this instance, the outer panel component 37 also constitutes the retaining means for retaining the retrorse fins 32 in engagement with the edge portion 25 and the wall portion 21.

Figure 8:
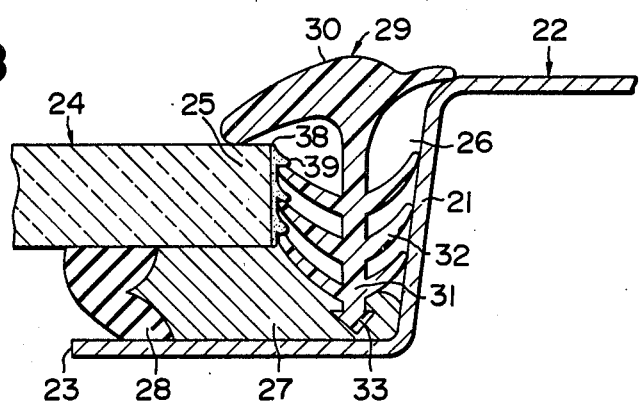

In the sixth embodiment of the window structure as shown in FIG. 8, a retaining member 38 is secured to the edge portion 25 of the window panel 24 and is formed with a plurality of ribs 39 extending in the gap 26 and angled away from the decorative trim portion 30 of the resilient molding 29 so as to be held in engagement with the retrorse fins 32, respectively. In this instance, the retaining member 38 also constitutes the retaining means for retaining the retrorse fins 32 in engagement with the edge portion 25 and the wall portion 21.

Figure 9:
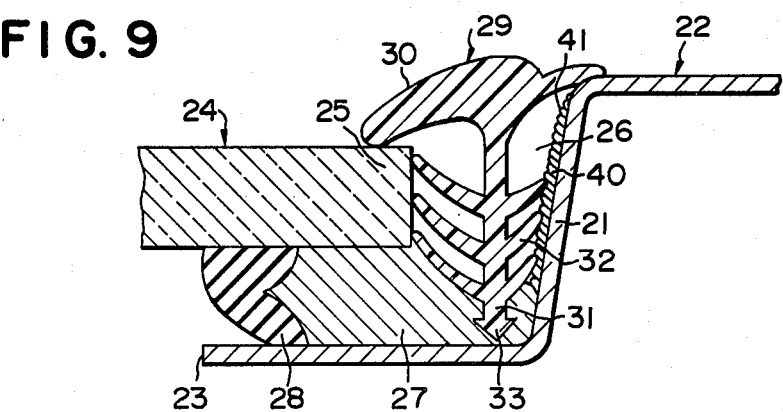

In the seventh embodiment of the window structure as shown in FIG. 9, a retaining member 40 is secured to the wall portion 21 of the vehicle body 22 and has a rough surface 41. The retaining member 40 is made of an adhesive material and is produced in such a way that the surface of the rataining member 40 is roughly finished by a suitable brush before the retaining member 40 has been cured. Thus, the retrose fins 32 are held in engagement with the rough surface 41 of the retaining member 40. In this instance, the retaining member 40 also constitutes the retaining means for retaining the retrorse fins 32 in engagement with the edge portion 25 and the wall portion 21.

Figure 10:
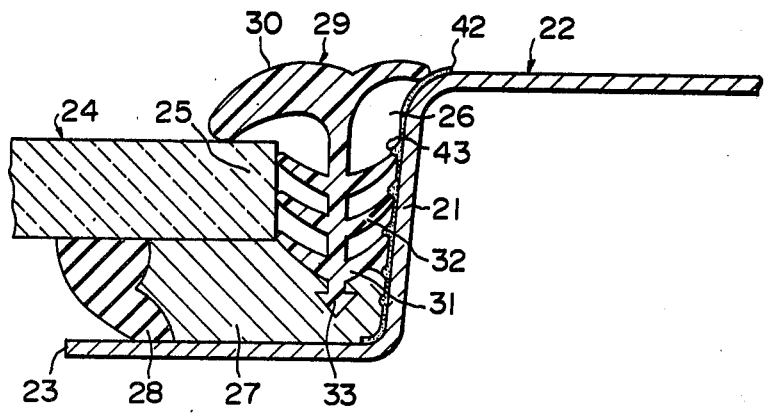

In the eighth embodiment of the window structure as shown in FIG. 10, a retaining member 42 is secured to the wall portion 21 of the vehicle body 22 and is formed with a plurality of ribs 43 extending in the gap 26 and angled away from the decorative trim portion 30 of the resilient molding 29 so as to be held in engagement with the retrorse fins 32, respectively. The inner end portion of the retaining member 42 is interposed between the adhesive compound 27 and the wall portion 21 while the outer end portion of the retaining member 42 extends to the outer surface of the vehicle body 22 so as to be held in engagement with the decorative trim portion 30 of the resilient molding 29. In this instance, the retaining member 42 also constitutes the retaining means for retaining the retrorse fins 32 in engagement with the edge portion 25 and the wall portion 21.

Figure 11:
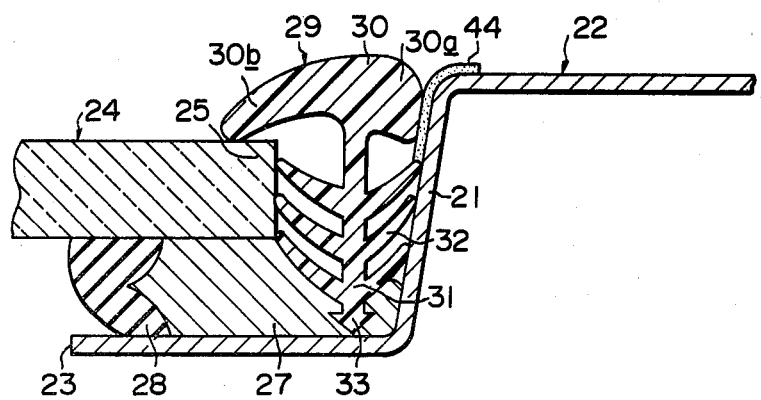

In the ninth embodiment of the window structure as shown in FIG. 11, the decorative trim portion 30 of the resilient molding 29 has outer and inner side portions 30a and 30b respectively bridging the vehicle body 22 and the window panel 24, the outer side portion 30a being formed larger in cross sectional area than the inner side portion 30b. A retaining element 44 is secured in part to the wall portion 21 of the vehicle body 22 with the outer side portion 30a of the trim portion 30 being held in pressing engagement with the retaining element 44. The retaining element 44 is edgewise held in engagement with one of the retrorse fins 32 of the resilient molding 29. In this instance, the retaining element 44 also constitutes the retaining means for retaining the retrorse fins 32 in engagement with the edge portion 25 and the wall portion 21.

Although particular first to ninth embodiments of the present invention have been shown and described, it will be obvious to those skilled in the art that various changes and modifications may be made without departing from the sprit and scope of the present invention.

What is claimed is:

1. A window structure of a vehicle body, comprising:
   a wall portion forming part of said vehicle body and defining an opening therein;
   a window panel closing said opening and having at least one edge portion extending along and spaced apart inwardly from said wall portion for forming a gap between said wall portion and the edge portion;
   a body of adhesive intervening between said vehicle body adjacent said gap and the edge portion of said window panel and securing the window panel to the vehicle body;
   a resilient molding having a decorative trim portion bridging said window panel and said vehicle body for covering said gap, a stem portion integral with said decorative trim portion and extending in said gap, said edge portion and said wall portion forming therebetween said gap, said gap having an outer end adjacent said decorative trim portion and an inner end remote from said decorative trim portion, the stem portion of said resilient molding extending between said outer end and said inner end, the stem portion having adjacent said inner end of the gap a bead which is generally arrow-shaped in cross section and which is embedded in said body of adhesive, and a plurality of retrorse fins extending outwardly from both sides of said stem portion and angled toward said decorative trim portion for engagement with said edge portion of said window panel and said wall portion of said vehicle body; and
   retaining means constituted by said edge portion of said window panel and said wall portion of said vehicle body, the width of said gap at said outer end being smaller than that of the gap at said inner end.

2. A window structure as set forth in claim 1, wherein at least one of said edge portion of said window panel and said wall portion of said vehicle body has a cross section which is such that the width of said gap is reduced from said inner end toward said outer end.

3. A window structure as set forth in claim 1, wherein said edge portion of said window panel has an end face, and at least one of the end face of said edge portion and said wall portion of the vehicle body is inclined with respect to the other thereof so that the width of said gap is reduced from said inner end toward said outer end.

4. A window structure as set forth in claim 1, wherein said edge portion of said window panel has a longitudinally extending ledge, said edge portion having a cross section which is such that the width of said gap at said outer end is smaller than that of said gap at said inner end, one of said retrorse fins of said resilient molding being held in resiliently pressing engagement with said ledge so that said resilient molding has its stem portion held in position in said gap with said bead embedded in said body of adhesive and with said one of the retrorse fins held in engagement with said ledge.

5. A window structure as set forth in claim 1, wherein said window panel comprises a laminar structure of at least two panel components consisting of inner and outer panel components attached to each other, the outer panel component projecting into said gap beyond said inner panel component and having a marginal inner surface protruding from an end face of said inner panel component, one of the retrorse fins being held in elastically pressing engagement with said marginal inner surface of the outer panel component.

* * * * *